US009906098B2

(12) United States Patent
Rosenberger et al.

(10) Patent No.: US 9,906,098 B2
(45) Date of Patent: Feb. 27, 2018

(54) METHOD FOR OPERATING A DRIVE DEVICE FOR A MOTOR VEHICLE AND CORRESPONDING DRIVE DEVICE

(71) Applicant: AUDI AG, Ingolstadt (DE)

(72) Inventors: Uwe Rosenberger, Eitensheim (DE); Markus Sonner, Kipfenberg (DE); Robert Kersten, Dresden (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/350,835

(22) Filed: Nov. 14, 2016

(65) Prior Publication Data
US 2017/0141650 A1 May 18, 2017

(30) Foreign Application Priority Data

Nov. 14, 2015 (DE) .......................... 10 2015 014 810

(51) Int. Cl.
| | |
|---|---|
| F01D 15/10 | (2006.01) |
| F02C 6/00 | (2006.01) |
| H02K 7/18 | (2006.01) |
| H02P 9/04 | (2006.01) |
| F01D 15/08 | (2006.01) |
| F01D 21/00 | (2006.01) |
| F02B 37/00 | (2006.01) |

(Continued)

(52) U.S. Cl.
CPC ........... *H02K 7/1823* (2013.01); *F01D 15/08* (2013.01); *F01D 15/10* (2013.01); *F01D 21/006* (2013.01); *F02B 37/005* (2013.01); *F02B 37/24* (2013.01); *F01D 17/165* (2013.01); *F05D 2220/40* (2013.01); *Y02T 10/144* (2013.01)

(58) Field of Classification Search
USPC ...................................... 290/52; 60/608, 772
See application file for complete search history.

(56) References Cited

U.S. PATENT DOCUMENTS

| | | | | |
|---|---|---|---|---|
| 4,051,679 A | * | 10/1977 | Collin .................... | B63H 23/08 192/218 |
| 4,078,378 A | * | 3/1978 | Gold ......................... | F02C 9/54 60/39.281 |

(Continued)

FOREIGN PATENT DOCUMENTS

| | | |
|---|---|---|
| DE | 10 2006 026 654 A1 | 12/2007 |
| DE | 102009015046 A1 * | 9/2010 ........... F01N 13/107 |

(Continued)

*Primary Examiner* — Pedro J Cuevas
(74) *Attorney, Agent, or Firm* — Henry M. Feiereisen LLC

(57) ABSTRACT

A method for operating a drive device for a motor vehicle, said method includes: permanently supplying an entire exhaust gas of a drive aggregate of the drive device to a turbine of an exhaust gas turbocharger of the drive device via a variable turbine geometry and providing compressed air by means of a compressor coupled with the turbine for the drive aggregate; operating in at least one operating mode of the drive device in each operating point of the drive aggregate an electric machine, which is mechanically operatively connected with the turbine and the compressor, as a generator for braking the turbine; and braking the turbine by means of the electric machine the stronger the further a throttle flap arranged fluidly between the compressor and the drive aggregate is opened, while maintaining the operating point of the drive aggregate constant.

11 Claims, 1 Drawing Sheet

(51) Int. Cl.
*F02B 37/24* (2006.01)
*F02B 33/44* (2006.01)
*F02C 1/00* (2006.01)
*F01D 17/16* (2006.01)

(56) References Cited

U.S. PATENT DOCUMENTS

| | | | | |
|---|---|---|---|---|
| 4,745,755 A | * | 5/1988 | Kawamura | F02B 37/005 |
| | | | | 290/52 |
| 4,998,951 A | * | 3/1991 | Kawamura | F02B 21/00 |
| | | | | 60/608 |
| 5,076,059 A | * | 12/1991 | Okada | F02B 37/10 |
| | | | | 123/198 DB |
| 5,635,768 A | * | 6/1997 | Birch | H02P 9/48 |
| | | | | 290/40 C |
| 5,887,434 A | * | 3/1999 | Arnell | F02B 37/105 |
| | | | | 123/561 |
| 2004/0103666 A1 | * | 6/2004 | Jonsson | F01D 21/006 |
| | | | | 60/772 |
| 2006/0162333 A1 | | 7/2006 | Isogai | |
| 2010/0089056 A1 | | 4/2010 | Cooper et al. | |
| 2010/0139268 A1 | * | 6/2010 | Huber | F02B 29/0475 |
| | | | | 60/602 |
| 2011/0022289 A1 | | 1/2011 | Hofbauer | |
| 2012/0000204 A1 | * | 1/2012 | Kesseli | F02C 3/107 |
| | | | | 60/778 |
| 2012/0137682 A1 | * | 6/2012 | Hatley | F02B 37/10 |
| | | | | 60/608 |
| 2012/0201657 A1 | * | 8/2012 | Donnelly | F02C 6/20 |
| | | | | 415/123 |
| 2013/0213036 A1 | * | 8/2013 | Kitsukawa | F02B 37/10 |
| | | | | 60/608 |
| 2013/0239568 A1 | * | 9/2013 | Krishnan | F02B 37/12 |
| | | | | 60/608 |
| 2015/0176481 A1 | * | 6/2015 | Jaeger | F01N 5/04 |
| | | | | 60/608 |
| 2015/0361855 A1 | * | 12/2015 | Gorgen | F02D 41/0087 |
| | | | | 60/274 |
| 2017/0145925 A1 | * | 5/2017 | Kusumi | F02C 9/20 |

FOREIGN PATENT DOCUMENTS

| | | |
|---|---|---|
| DE | 10 2012 009 288 A1 | 11/2012 |
| DE | 10 2012 004 394 A1 | 9/2013 |
| FR | 2936276 A1 * 3/2010 | ......... F02B 29/0475 |

\* cited by examiner

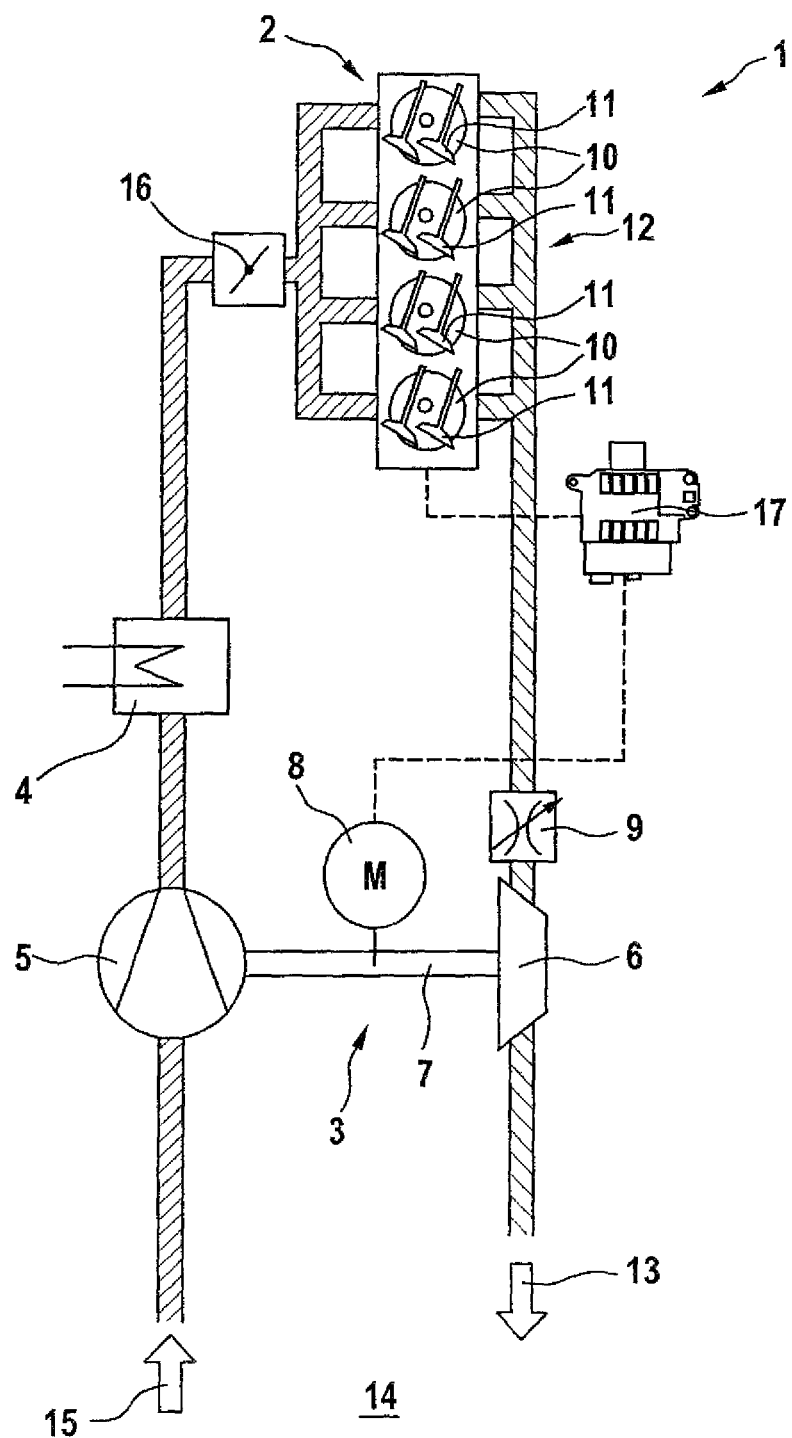

METHOD FOR OPERATING A DRIVE DEVICE FOR A MOTOR VEHICLE AND CORRESPONDING DRIVE DEVICE

CROSS-REFERENCES TO RELATED APPLICATIONS

This application claims the priority of German Patent Application, Serial No. 10 2015 014 810.9, filed Nov. 14, 2015, pursuant to 35 U.S.C. 119 (a)-(d), the content of which is incorporated herein by reference in its entirety as if fully set forth herein.

BACKGROUND OF THE INVENTION

The invention relates to a method for operating a drive device for a motor vehicle.

The drive aggregate serves for example for driving a motor vehicle, i.e., for providing a torque that is directed towards driving the motor vehicle. The drive device has the rive aggregate and the exhaust gas turbocharger. The exhaust gas turbocharger is assigned to the drive aggregate. Exhaust gas generated by the drive aggregate is thus supplied to the exhaust gas turbocharger or its turbine. The exhaust gas flows through the turbine, wherein kinetic energy and/or enthalpy of the exhaust gas is converted into mechanical energy. This mechanical energy serves for driving the compressor of the exhaust gas turbocharger, which is coupled with the turbine or mechanically operatively connected with the turbine.

The compressor compresses air, in particular fresh air, which is subsequently provided to the drive aggregate. The air compressed by the compressor may also be present in the form of an exhaust gas-air-mixture when an external exhaust gas recirculation is provided. The drive aggregate is for example configured as an internal combustion engine. As an alternative it can also be configured as a fuel cell. The exhaust gas turbocharger is or can be electrically supported. For this purpose the electric machine is provided, which is coupled or mechanically operatively connected with the turbine or the compressor. By means of the electric machine a torque can thus be provided which acts on a rotor assembly of the turbine or the compressor.

It would be desirable and advantageous to provide a method for operating a drive device, which has advantages compared to known methods and in particular enables increasing the efficiency of the drive device.

SUMMARY OF THE INVENTION

According to one aspect of the present invention a method for operating a drive device for a motor vehicle includes permanently supplying an entire exhaust gas of a drive aggregate of the drive device to a turbine of an exhaust gas turbocharger of the drive device via a variable turbine geometry and providing compressed air by means of a compressor coupled with the turbine to the drive aggregate; operating in at least one operating mode of the drive device in each operating point of the drive aggregate an electric machine, which is mechanically operatively connected with the turbine and the compressor, as a generator for braking the turbine; and braking the turbine by means of the electric machine the stronger the further a throttle flap arranged fluidly between the compressor and the drive aggregate is opened, while maintaining the operating point of the drive aggregate constant.

The exhaust gas turbocharger or its turbine has the variable turbine geometry and is insofar configured as VTG charger. This means that the turbine beside the rotor assembly or rotor has adjustable guide vanes, which can be adjusted in dependence on an operating point. The variable turbine geometry hereby generally speaking operates as a cross section adjustment element arranged upstream of the turbine. By means of the variable turbine geometry the exhaust gas pressure between the drive aggregate and the turbine or downstream of the drive aggregate and upstream of the turbine can be adjusted. An adjustment of the variable turbine geometry or its guide vanes is for example accomplished electrically or pneumatically. Due to the variable turbine geometry a waste gate by means of which exhaust gas may be conducted around the turbine, is not required the exhaust gas turbocharger is thus configured without a waste gate.

The entire exhaust gas of the drive aggregate is supplied to the turbine via a variable turbine geometry. This means that the turbine is fluidly connected with the drive aggregate without branch points, i.e., a continuous flow connection is present between the drive aggregate and the turbine. Along this flow connection the entire exhaust gas generated by the drive aggregate is discharged and subsequently supplied to the turbine.

In the at least one operating mode of the drive device it is provided that the electric machine is used for braking the turbine and is thus operated as a generator. The operating mode is for example an efficiency operating mode. The braking of the turbine in the at least one operating mode is provided in each operating point of the drive aggregate, wherein the operating point is preferably characterized by the actual rotational speed and/or the actual torque of the drive aggregate. Of course the operating point can also be characterized by an electrical power provided by the drive aggregate when the dive aggregate is configured as a fuel cell.

The braking is performed at each rotational speed and/or each torque of the drive aggregate when the at least one operating point is present. When on the other hand a high-performance operating mode is performed it can be provided to use the electric machine at least temporarily, in particular permanently and/or in at least one operating point of the drive aggregate, in particular in all operating points for operating the compressor, i.e. to operate the electric machine as an electric motor.

For braking the turbine the electric machine is operated as a generator. Correspondingly electrical energy is generated, which can be used as desired. For example the energy is supplied to an onboard network of the motor vehicle and/or is temporarily stored in an energy storage. Generally it is provided that the turbine is braked by the electric machine the stronger the more the throttle flap is opened. The throttle flap is fluidly arranged between the compressor and the drive aggregate and serves for adjusting the air mass flow that flows to the drive aggregate. The operating point of the drive aggregate is hereby held constant independent of the opening degree of the throttle flap.

The throttle flap serves as a "pressure limiter" upstream of the drive aggregate and throttles the pressure that is supplied to the drive aggregate, i.e., an ambient pressure in the external environment and/or a charge pressure provided by the exhaust gas turbocharger. An air mass flow into the drive aggregate is established in dependence on the pressure supplied to or acting on the drive aggregate. The air mass flow can additionally be dependent on at least one of the following variables: rotational speed of the dive aggregate, state of un-load/on-load change-over devices, in particular an opening degree of un-load/on-load change-over valves and/or a temperature of the fresh air upstream of the drive aggregate, for example an intake duct.

In order to improve the efficiency of the drive device it is the goal to more efficiently use the ambient pressure of the air present in the external environment of the drive device in the at least one operating mode. For this purpose the throttle flap is opened further. As a result more air flows in the direction of the drive aggregate, i.e., the air mass flow is increased. However, at the same time the exhaust gas pressure is increased, which is fluidly determined between the drive aggregate and the turbine. This leads to a higher residual gas portion in the drive aggregate and at the same time to an increase of the turbine power. For example the throttle flap is opened in response to a change of a flow-through cross section of a variable turbine geometry of the turbine of the exhaust gas turbocharger towards smaller flow-through cross sections, i.e., in response to a reduction of the flow-through cross section. This is explained below.

The described increase of the turbine power would normally lead to an analog increase of the compressor power so that the air mass flow supplied to the drive aggregate is further increased and the operating point of the drive aggregate is shifted. In order to achieve this the electric machine is operated as a generator so that the turbine or the compressor is braked. The increased turbine power is thus not supplied to the compressor but rather converted into electrical energy by means of the electric machine and is withdrawn from the exhaust gas turbocharger. The more the throttle flap is opened while the operating point of the drive aggregate remains constant, the stronger the turbine has to be braked by using the electric machine in order to counteract the unwanted increase of the air mass flow.

Accordion to another advantageous feature of the invention, the throttle flap is completely opened and at the same time the electric machine operated or adjusted so that the operating point of the drive aggregate remains constant. This approach has the result that the drive aggregate is de-throttled by the opening of the throttle flap and thus the ambient pressure can be used more efficiently. Correspondingly the efficiency of the drive aggregate increases. At the same time the electric machine provides electrical energy, which can be used for other purposes.

As described above electrical energy can be withdrawn or recuperated by means of the variable turbine geometry in particular in the full load and/or in the charged range without negatively affecting the specific fuel consumption by shift of the operating point of the turbocharger, in particular the exhaust gas turbine. Hereby preferably the operating point of the exhaust gas turbocharger is shifted on a rotational-speed-hyperbolic curve in the direction of the optimum, i.e., the efficiency maximum the rotational speed of the exhaust gas turbocharger is changed in order to improve the efficiency of the drive device.

Accordion to another advantageous feature of the invention, the variable turbine geometry is closed the further the more the throttle flap is opened. Also this is preferably provided while the operating point of the drive aggregate remains constant. The closing of the variable turbine geometry has the result that the exhaust gas counter pressure and at the same time the enthalpy gradient over the turbine increases. The further the turbine geometry is closed the more power the turbine provides and the stronger the turbine has to be braked by means of the electric machine.

It can be provided that first the variable turbine geometry is partially closed or further closed. This increases the exhaust gas counter pressure. This causes an increase of the residual gas proportion; a greater portion is thus filled with residual gas while the volume remains constant. In order to supply the same fresh air mass to the drive aggregate the fresh air thus has to be provided at a higher pressure. For this purpose the throttle flap is opened further. For example it is also provided to set a desired opening degree of the throttle flap and subsequently close or further close the variable turbine geometry.

The drive aggregate is preferably operated so that the operating point remains constant; correspondingly the throttle flap is opened the further the further the variable turbine geometry is closed. The closing of the variable turbine geometry and the corresponding opening of the throttle flap occurs until the throttle flap has assumed the desired opening degree. For example the desired opening degree is selected so that the efficiency of the exhaust gas turbocharger is optimal, i.e. preferably corresponds to its maximum. In order to implement the afore-described approach the turbine of the exhaust gas turbocharger has to be braked by means of the electric machine the stronger the further the throttle flap is opened and/or the variable turbine geometry is closed.

Accordion to another advantageous feature of the invention, the turbine is braked the stronger with the electric machine the further the variable turbine geometry is closed. This was mentioned above. As a result of closing the variable turbine geometry, in particular while the operating point of the drive aggregate remains the same, the enthalpy gradient over the turbine increases so that the power of the turbine increases. Therefore the turbine or the compressor is to be braked stronger.

Accordion to another advantageous feature of the invention, a brake power of the electric machine, a position of the variable turbine geometry and an opening degree of the throttle flap are selected in dependence on the actual operating point of the drive aggregate. The mentioned variables depend on each other so that each variable is correspondingly a function of the respective other variables and the operating pint of the device aggregate. For example it is provided that first the position of the variable turbine geometry and the opening degree of the throttle flap is determined by way of the operating point of the drive aggregate when the electric machine is not used for braking, i.e., the braking power is zero. Based thereon the opening degree of the throttle flap is subsequently increased while keeping the operating point the same, i.e., the throttle flap is opened further.

In order to keep the operating point constant the position of the variable turbine geometry is changed, in particular the variable turbine geometry is closed further. This results in the increase of the turbine power described above, which is withdrawn from the exhaust gas turbocharger by correspondingly selecting the brake power of the electric machine so that no change of the operating point of the drive aggregate results. As explained above the throttle flap is preferably opened completely or at least to the degree as can be compensated by braking by means of the electric machine. The goal is thus to adjust the electric machine so that the degree to which the throttle flap is opened can be maximized.

Accordion to another advantageous feature of the invention, the brake power, the position and the opening degree are determined by means of a characteristic curve and/or a regulation. As already explained above the three mentioned variables can be determined in dependence on the actual operating point of the drive aggregate. Because these variables also relate to each other it is advantageous to store these variables in the characteristic curve or in multiple characteristic curves and to read the variables out from the characteristic curve in dependence on the actual operating point of the drive aggregate and to adjust the variables. In addition or as an alternative the mentioned variables can however also be determined in the open loop control.

Hereby it can for example be provided that the open loop control has the efficiency of the drive device, in particular the drive aggregate, as input variable. The approach described above thus has the goal to improve the efficiency of the drive device or the drive aggregate. Correspondingly it can be provided to determine the actual efficiency and to use the actual efficiency as input variable of the open loop control. By means of the open loop control the brake power, the position of the variable turbine geometry and the opening degree are changed in a regulated manner so that as a result the efficiency is increased preferably based on an operation of the drive device with a brake power of zero.

Accordion to another advantageous feature of the invention, when the throttle flap is completely opened the brake power and the position are selected so that the drive aggregate is operated at the greatest possible efficiency. The goal of the method is to use the ambient pressure as efficiently as possible. Correspondingly it is particular advantageous when the throttle flap is opened as far as possible, in particular completely. Therefore the position of the variable turbine geometry and correspondingly the brake power have to be adjusted so that the desired operating point of the drive aggregate is established. At the same time the brake power and the position of the variable turbine geometry are to be selected so that the best efficiency is obtained.

Accordion to another advantageous feature of the invention, the drive aggregate is operated with a defined fuel-air-ratio, which is kept constant by closing the variable turbine geometry when opening the throttle flap. For operating the drive device the fuel-air-mixture is supplied to the drive aggregate. The fuel-air-mixture preferably corresponds to a stoichiometric ratio between fuel and air. As a result of opening the throttle flap while otherwise keeping the operating point constant, i.e., also at constant fuel mass flow into the drive aggregate, the increase of the exhaust gas counter pressure may lead to a change of the fuel-air-ratio.

This is to be counteracted by closing the variable turbine geometry. Preferably the position of the variable turbine geometry is selected so that the fuel-air-mixture remains constant when opening the throttle flap and simultaneously keeping the fuel mass flow constant. In this way an efficient post treatment of the exhaust gas of the drive device is possible, in particular downstream of the exhaust gas turbocharger. This also serves for keeping the operating point of the drive aggregate constant.

Accordion to another advantageous feature of the invention, electrical energy provided by means of the electric machine is used for driving a further electric machine, which is mechanically operatively connected with the drive aggregate. The further electric machine is for example directly connected to the drive aggregate, or indirectly via a transmission. The operative connection between the further electric machine and the drive aggregate can be permanent or may be selectively generated or interrupted by means of a clutch. For example the further electric machine is coupled with a crankshaft of the drive aggregate when the drive aggregate is constructed in the form of an internal combustion engine.

According to another aspect of the invention, a drive device for a motor vehicle, said drive device includes: a drive aggregate; an exhaust gas turbocharger having a turbine, said turbine permanently receiving an entire amount of exhaust gas generated by the drive aggregate via a variable turbine geometry; a compressor coupled with the turbine, said drive aggregate receiving compressed air compressed by means of the compressor; an electric machine mechanically operatively connected with the turbine and the compressor; and a throttle flap arranged fluidly between the compressor and the drive aggregate, wherein in at least one operating mode of the drive device the drive device is configured to operate the electric machine as a generator in each operating point of the drive aggregate for braking the turbine, and to brake the turbine by means of the electric machine the stronger the further the throttle flap is opened while maintaining the operating point of the drive aggregate constant.

Other features and advantages of the present invention will be more readily apparent upon reading the following description of currently preferred exemplified embodiments of the invention with reference to the accompanying drawing, in which the sole FIGURE shows a schematic representation of a drive device for a motor vehicle.

DETAILED DESCRIPTION OF PREFERRED EMBODIMENTS

Throughout all the FIGURE, same or corresponding elements may generally be indicated by same reference numerals. These depicted embodiments are to be understood as illustrative of the invention and not as limiting in any way. It should also be understood that the FIGURE are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The FIGURE shows a schematic representation of a drive device 1 for a motor vehicle. The drive device 1 has a drive aggregate 2, in the here shown exemplary embodiment an internal combustion engine. The drive device 1 also has an exhaust gas turbocharger 3 and optionally a charge air cooler 4. The exhaust gas turbocharger 3 has a compressor 5 and a turbine 6. These are coupled with each other via a shaft 7, preferably rigidly and/or permanently. On the shaft 7 also an electric machine 8 engages, which can insofar be used for driving or supporting the exhaust gas turbocharger 3.

The turbine 6 has a variable turbine geometry 9, which is can generally be referred to as a cross-section-adjustment element upstream of the turbine 6. However, particularly preferably the variable turbine geometry 9 is a guide wheel of the turbine 6 and thus has multiple adjustable guide vanes. The turbine 6 serves for driving the compressor 5 via the shaft 7. For this purpose exhaust gas, which is generated by the drive aggregate 2, is supplied to the turbine 6.

In the here shown exemplary embodiment the entire exhaust gas generated by the drive aggregate 2 is supplied to the turbine 6, i.e., that the exhaust gas turbocharger 3 is configured without a waste gate. Rather all cylinders 10 of the drive aggregate 2 are connected fluidly to the turbine 6, in particular respectively via at least one outlet valve 11 and/or a exhaust manifold 12. The exhaust gas generated by the drive aggregate 2 flows through the turbine 6, wherein kinetic flow energy and/or enthalpy is withdrawn from the exhaust gas. Subsequently the exhaust gas is discharged in the direction of the arrow 14 towards an external environment 14.

The energy withdrawn from the exhaust gas by means of the turbine 6 is used for driving the compressor 5. The compressor serves for compressing air, for example fresh air, which was withdrawn from the external environment 14. The air flows thus in the direction of the arrow 15 into the drive device 1 and moves though the compressor 5 and optionally the charging air cooler 4 in the direction of the drive aggregate 2. Fluidly provided between the compressor 5 and the drive aggregate 2, in particular downstream of the charging air cooler 4, is a throttle flap 16 of the drive aggregate 2. By means of the throttle flap 16 the air mass flow conducted to the drive aggregate 2 can be adjusted. In particular when the drive aggregate 1 is operated at partial load the throttle flap 16 is usually partially closed. Correspondingly throttle losses occur, which are to be avoided. For this purpose it is provided that while maintaining the operating point of the drive aggregate 2 constant the throttle flap 16 is further opened in order to more efficiently use the ambient pressure of the air present in the external environment 14. As a result however the air mass flow increases in the direction of the derive aggregate 2 so that simultaneously also the exhaust gas counter pressure increases between the drive aggregate 2 and the turbine 6.

As a result of increasing the exhaust gas counter pressure the power of the turbine 6 increases so that for operating the compressor 5 a higher power is available. Correspondingly the air mass flow would further increase and the exhaust gas pressure would further increase. However because at the same time the operating point is kept constant, i.e., for example because the fuel mass flow into the drive aggregate 2 remains constant, the fuel-air-ratio may change, and may in particular deviate from a stoichiometric ratio. In order to avoid this the variable turbine geometry 9 is further closed also while the operating point of the drive aggregate remains the same. This however causes a further power increase of the turbine 6.

In order to prevent that the compressor 5 is impinged with a greater power and correspondingly the air mass flow is further increased the excessive power is withdrawn by means of the electric machine 8. For this purpose the electric machine 8 is operated as a generator so that the turbine 6 and thus the compressor 5 can be braked with the electric machine 8. The herby generated electrical energy can for example be supplied to an onboard network of the motor vehicle and/or for driving a further electric machine 17.

The further electric machine 17 is for example mechanically operatively connected with the drive aggregate 2 so that by means of the drive device 1 a greater torque can be provided. However this can tin turn influence the operating point of the drive aggregate 2 so that depending on the circumstances a further adjustment of the position of the variable turbine geometry 9 and/or a stronger braking of the turbine 6 by means of the electric machine 8 is required.

What is claimed is:

1. A method for operating a drive device for a motor vehicle, said method comprising:
    permanently supplying an entire exhaust gas of a drive aggregate of the drive device to a turbine of an exhaust gas turbocharger of the drive device via a variable turbine geometry and providing compressed air by means of a compressor coupled with the turbine for the drive aggregate;
    operating in at least one operating mode of the drive device in each operating point of the drive aggregate an electric machine, which is mechanically operatively connected with the turbine and the compressor, as a generator for braking the turbine; and
    braking the turbine by means of the electric machine the stronger the further a throttle flap arranged fluidly between the compressor and the drive aggregate is opened, while maintaining the operating point of the drive aggregate constant.

2. The method of claim 1, wherein the variable turbine geometry is closed the further the further the throttle flap is opened.

3. The method of claim 1, wherein the turbine is braked by means of the electric machine the stronger the further the variable turbine geometry is closed.

4. The method of claim 1, wherein a brake power of the electric machine, a position of the variable turbine geometry and an opening degree of the throttle flap is selected in dependence on the actual operating point of the drive aggregate.

5. The method of claim 4, wherein the brake power, the position of the variable turbine geometry and the opening degree of the throttle flap are determined by means of at least one of a characteristic curve and an open loop control.

6. The method of claim 5, wherein an efficiency of the drive device is an input variable in the open loop control.

7. The method of claim 6, wherein an efficiency of the drive aggregate is an input variable in the open loop control.

8. The method of claim 4, wherein when the throttle flap is fully opened, the brake power of the electric machine and the position of the variable turbine geometry are selected so that the drive aggregate is operated at a greatest possible efficiency.

9. The method of claim 1, wherein the drive aggregate is operated with a defined fuel-air-ratio which is kept constant by closing the variable turbine geometry when the throttle flap is opened.

10. The method of claim 1, wherein electrical energy provided by means of the electric machine is used for driving a further electric machine which is mechanically operatively connected with the drive aggregate.

11. A drive device for a motor vehicle, said drive device comprising:
    a drive aggregate;
    an exhaust gas turbocharger having a turbine, said turbine permanently receiving an entire amount of exhaust gas generated by the drive aggregate via a variable turbine geometry;
    a compressor coupled with the turbine, said drive aggregate receiving compressed air compressed by means of the compressor;
    an electric machine mechanically operatively connected with the turbine and the compressor; and
    a throttle flap arranged fluidly between the compressor and the drive aggregate,
    wherein in at least one operating mode of the drive device the drive device is configured to operate the electric machine as a generator in each operating point of the drive aggregate for braking the turbine, and to brake the turbine by means of the electric machine the stronger the further the throttle flap is opened while maintaining the operating point of the drive aggregate constant.

\* \* \* \* \*